United States Patent [19]

Penny et al.

[11] Patent Number: 4,657,300
[45] Date of Patent: Apr. 14, 1987

[54] CAMPER

[76] Inventors: Steven J. Penny; Donald J. Fraser, both of 15 Villeroy Street, Hampton, Victoria, Australia

[21] Appl. No.: 790,047

[22] Filed: Oct. 22, 1985

[30] Foreign Application Priority Data

Oct. 23, 1984 [AT] Austria ................................ PG7782

[51] Int. Cl.⁴ ............................................. B60P 3/32
[52] U.S. Cl. ................................... 296/173; 296/170; 296/27
[58] Field of Search ................... 296/26, 27, 159, 160, 296/164, 165, 170, 171, 173, 175

[56] References Cited

U.S. PATENT DOCUMENTS

| | | | |
|---|---|---|---|
| 2,811,725 | 11/1957 | Cence | 296/160 |
| 3,013,836 | 12/1961 | Groh | 296/170 |
| 3,456,978 | 7/1969 | Daniels et al. | 296/170 |
| 3,463,538 | 8/1969 | Koon | 296/27 X |
| 3,506,299 | 4/1970 | Arnold et al. | 296/170 |
| 3,558,181 | 1/1971 | Peterson | 296/27 |
| 3,583,755 | 6/1971 | Hedrick, Jr. | 296/170 |
| 3,694,022 | 9/1972 | Dontigny | 296/170 |
| 3,884,520 | 5/1975 | Peterson | 296/170 |
| 3,915,492 | 10/1975 | Agnese | 296/26 |
| 4,463,982 | 8/1984 | Irelan | 296/170 |

FOREIGN PATENT DOCUMENTS

| | | | |
|---|---|---|---|
| 154779 | 3/1952 | Australia . | |
| 446367 | 9/1972 | Australia . | |
| 875442 | 7/1971 | Canada | 296/171 |
| 6072 | 12/1979 | European Pat. Off. . | |
| 1015333 | 9/1952 | France . | |
| 2236686 | 2/1975 | France . | |
| 795594 | 5/1958 | United Kingdom | 296/165 |

Primary Examiner—Robert B. Reeves
Assistant Examiner—Dennis H. Pedder
Attorney, Agent, or Firm—Finnegan, Henderson, Farabow, Garrett & Dunner

[57] ABSTRACT

A camper which comprises a pair of laterally extending sections which are coupled to a roof by a plurality of strut pairs. A canvas wall is connected between the roof and the sections and includes elastic cords which are stretched when the camper is erected and which cause the canvas walls to fold inwardly when the camper is folded. The sections are provided with threaded shafts which are engaged by gear assemblies and which are driven by a motor to cause the sections to move outwardly which in turn pivots the struts to force the roof upwardly to erect the camper and which upon reversing of the motor causes the sections to move inwardly into an overlapping position which pivots the struts downwardly to draw the roof down to the folded position.

9 Claims, 8 Drawing Figures

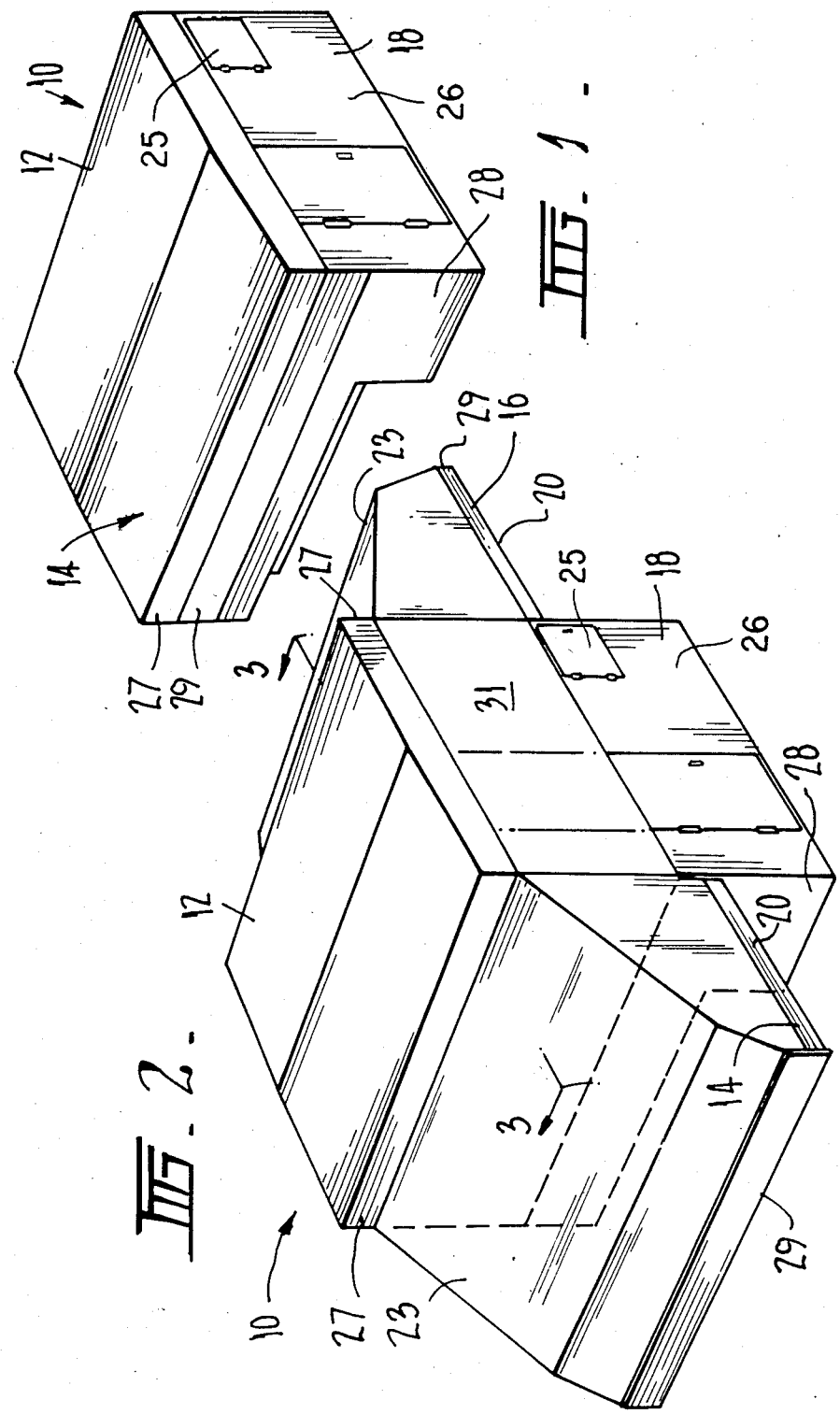

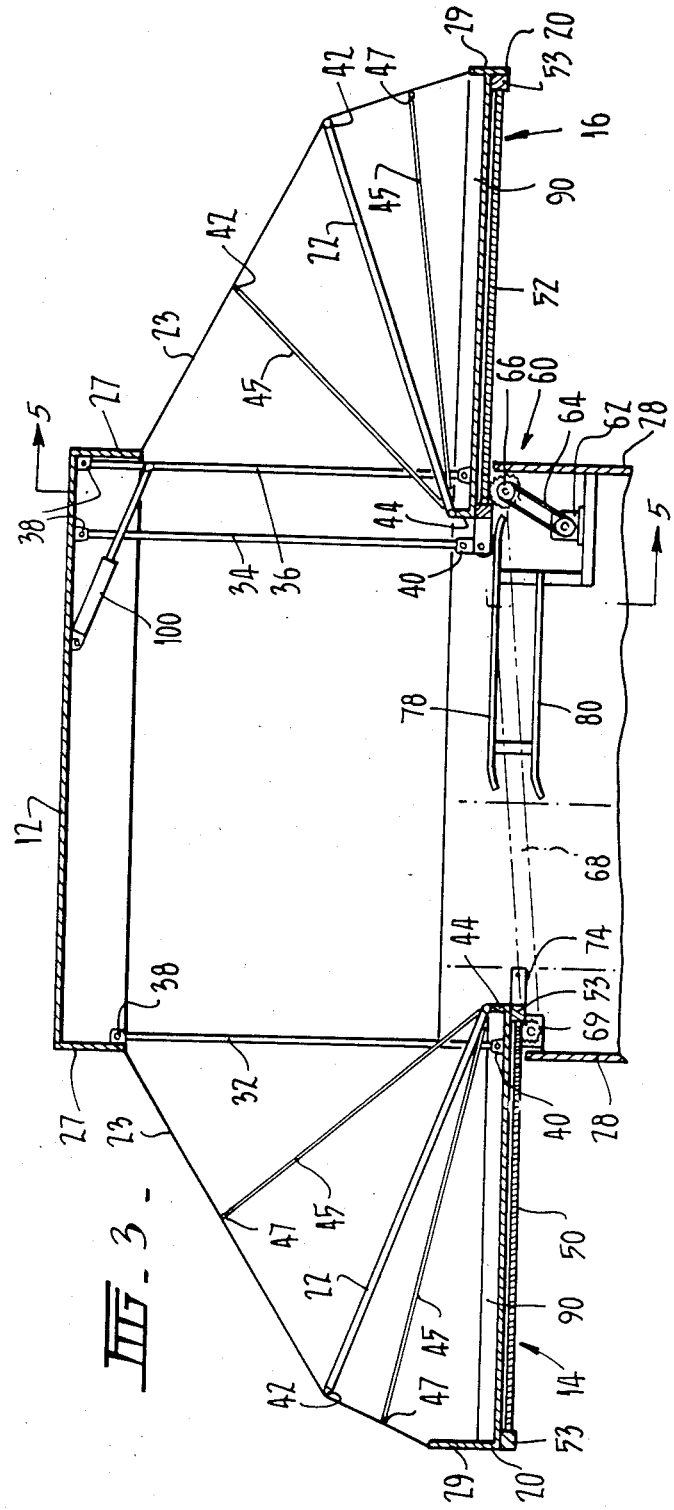

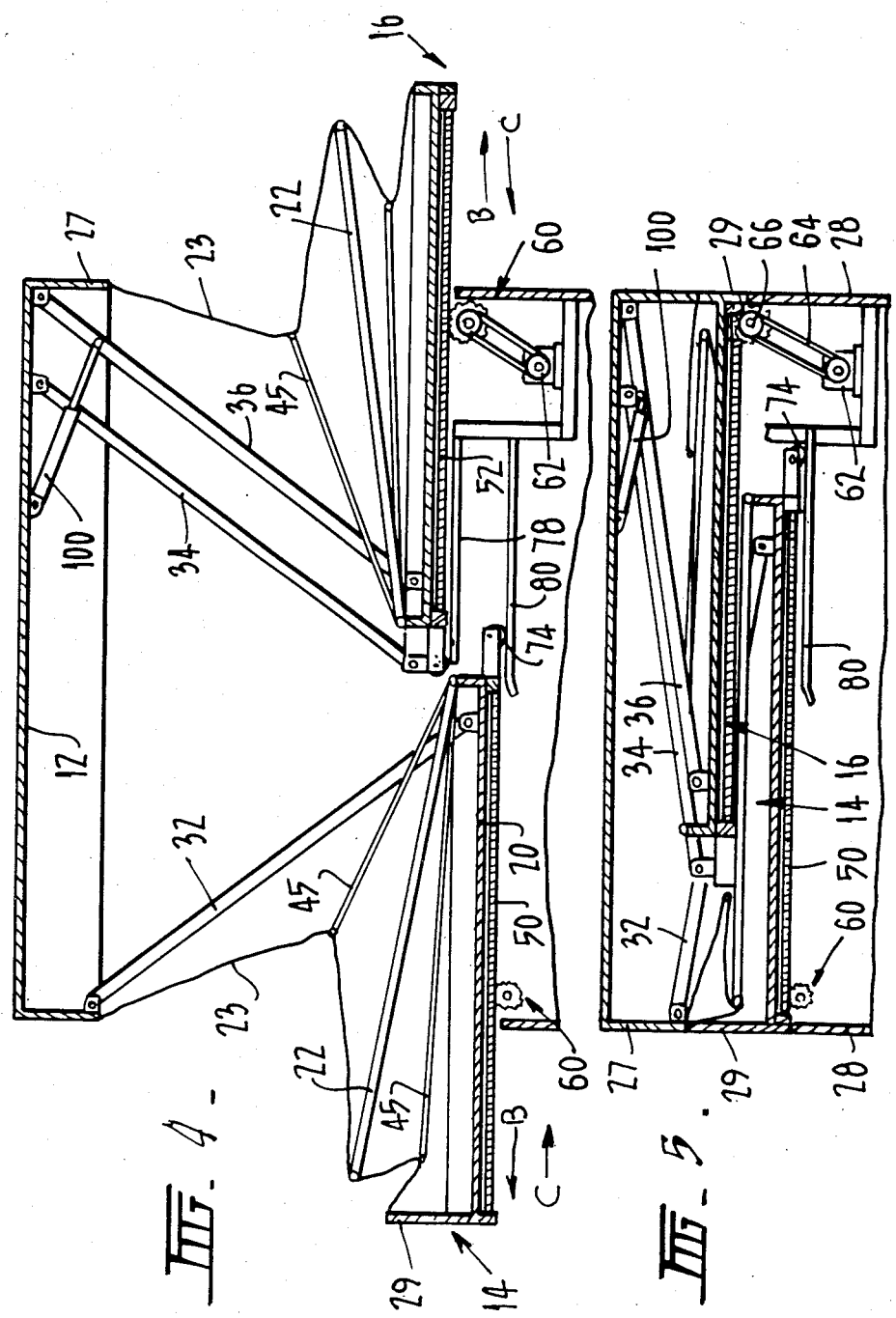

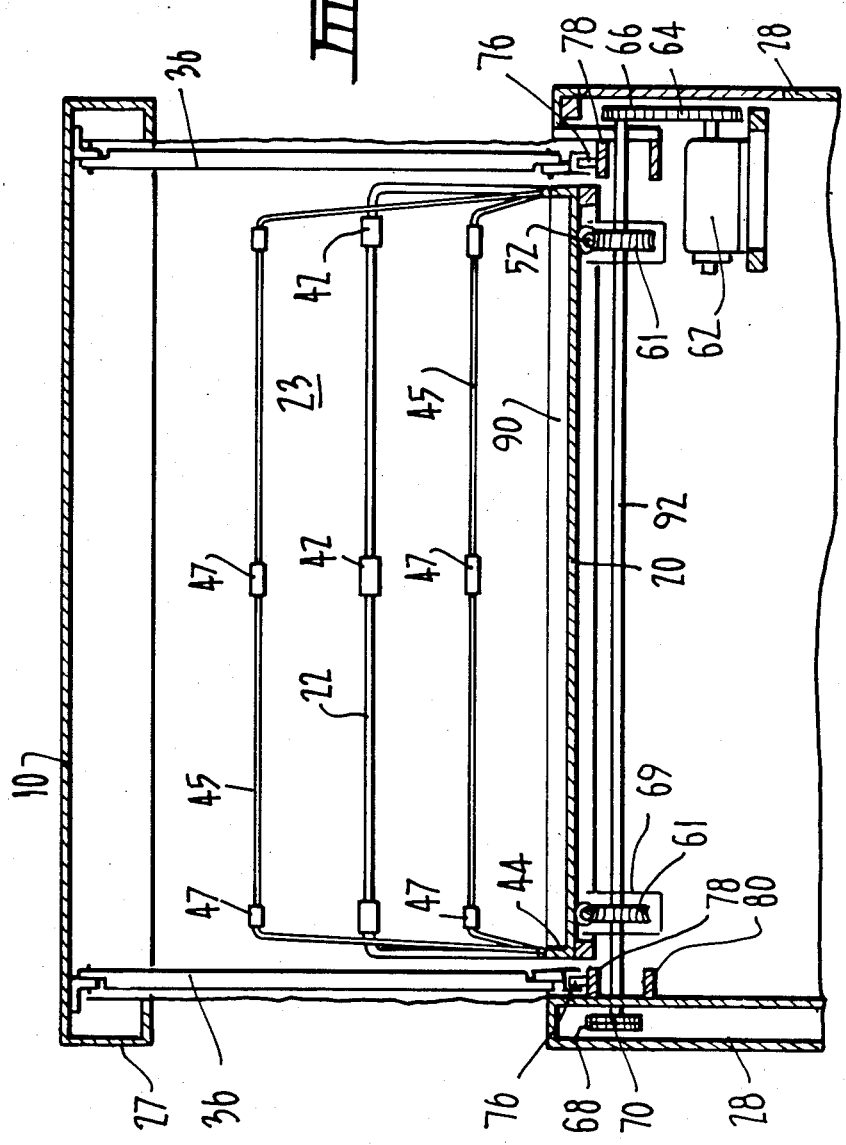

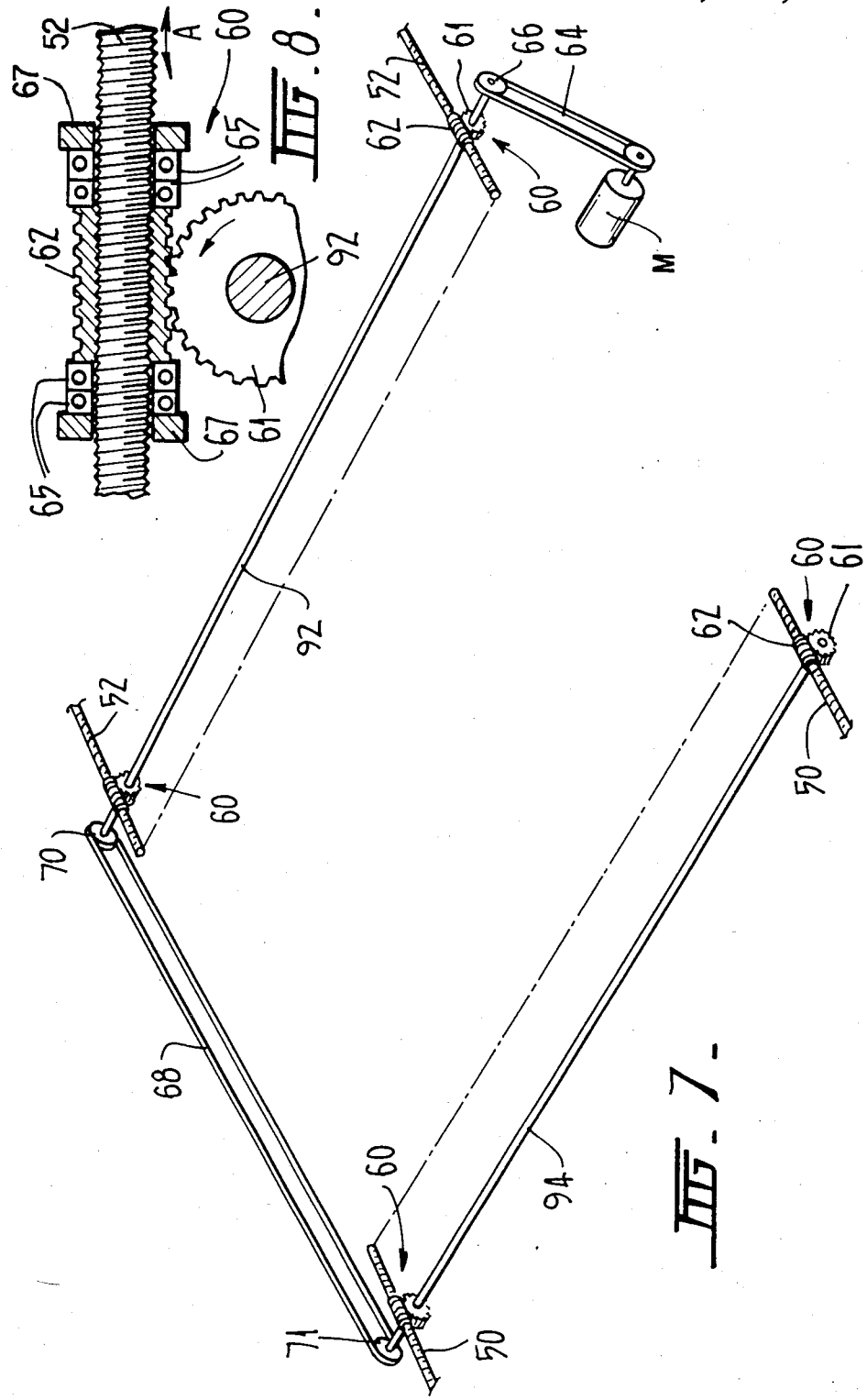

CAMPER

This invention relates to campers.

Campers are well known and are used by holiday makers as a means of accommodation while camping, travelling or the like. Campers are provided in a number of forms. They can take the form of a van or the like or they can take the form of a structure which is fitted to a vehicle and which is adapted to be assembled for use and disassembled for transportation.

Campers which are in the form of a vehicle or in the form of a permanent structure attached to a vehicle can often be top heavy thereby making the vehicle difficult to handle and dangerous to drive. Conventional campers which are adapted to be assembled and disassembled for use and transportation respectively require a considerable amount of manual work in their assembly and disassembly which is both labour intensive and time consuming.

The object of this invention is to provide a camper which can be easily erected and folded down and which can be transported safely on a vehicle or towed by a vehicle to which it is attached.

The invention may be said to reside in a camper, said camper having a roof and a base portion which define a living area therebetween, two laterally extendable sections between the roof and the base, coupling means for coupling said two laterally extending sections to the roof, and driving means for moving said roof between an extended position and a retracted position or at least one of said two laterally extendable sections between an extended position outwardly of the living area and a retracted position beneath said roof in the living area, said coupling means between the roof and the two laterally extendable sections being such that upon movement of either the laterally extendable sections or the roof, by the drive means, the other of the laterally extendable sections or the roof is caused to move between its extended position and retracted position and said laterally extendable sections being overlapped with one another when in the retracted position beneath said roof.

Accordingly, since drive means is provided for moving the roof or lateral section from the retracted to the extended position and the coupling means causes the other of the means to move between each extended position and retracted position, the camper can be easily erected and folded down by simply actuating the drive means and the extendable sections being overlapped when in the retracted position saves a considerable amount of space when the camper is in the folded condition.

Preferably the laterally extendable sections are arranged at different heights so that upon movement to the retracted position the sections overlap with one another. Preferably guide tracks are provided for guiding movement of the sections, each section having a roller for engaging its guide track.

Preferably the coupling means comprises struts which are pivotly coupled to the roof and the two laterally extendable sections such that when the drive means draws the laterally extendable sections between their extended and retracted positions the struts are caused to pivot in a generally vertical plane to draw the roof between its extended and retracted positions.

Preferably the drive means comprises a motor which drives gear assemblies which engage threaded shafts coupled to the sections for driving the sections between the retracted and extended positions.

The invention also provides a camper having a roof and a base portion which define a living area therebetween, means for driving said roof between a retracted position in which said roof is close to said base and an extended position in which said roof is upwardly of said base so that a user can gain an entry to said living area, a deformable wall means arranged between said roof and said base, said wall means having elastic means coupled thereto such that when said roof moves to the extended position said elastic means is stretched and wherein when said roof is moved to the retracted position said elastic means draw said wall means inwardly of said camper to cause the wall means to fold into said camper.

The provision of elastic means thereby automatically enables the deformable wall means to fold inwardly thereby ensuring that the wall means is not left outside the camper when the roof is in the retracted position which is not only untidy but could cause damage to the wall means.

Preferably the elastic means comprises a plurality of elastic cords.

Preferably two wall means are provided at each end of the camper, each wall means extending between the roof of the camper and a respective laterally extending section which is adapted to move laterally of said camper from a retracted position to an extended position and wherein said driving means drives said laterally extending sections from the retracted to the extended position and coupling means is arranged between the laterally extending sections and the roof so that when said laterally extending sections are driven outwardly by said driving means, said roof is caused to move from the retracted position to the extended position.

A preferred embodiment of the invention will be described with reference to the accompanying drawings in which:

FIG. 1 is a perspective view of a camper according to the preferred embodiment of the invention in a folded condition;

FIG. 2 is a view of the camper of FIG. 1 in an erected condition;

FIG. 3 is a view along the line 3—3 of FIG. 2;

FIG. 4 is a view similar to FIG. 3 with the camper in an intermediate position between the folded and erected conditions;

FIG. 5 is a view similar to FIG. 3 in the folded condition;

FIG. 6 is a view along the line 6—6 of FIG. 3;

FIG. 7 is a view of a drive system; and

FIG. 8 is a detailed view of part of the system of FIG. 7.

With reference to FIGS. 1, 2 and 3, the camper 10 comprises a roof 12, a pair of laterally extending portions or sections 14 and 16 and a pair of ends 18 (only one of which is shown).

The laterally extending portions 14, 16 preferably comprise a base board 20 and U-shaped frame members 22 over which canvas side walls 23 or the like are provided to provide a space which may be used for sleeping. The sides 23 are formed from canvas or the like deformable material which can be folded and are arranged between a side panel 27 of roof 12 and a side panel 29 connected at the ends of the sections 14 and 16. The ends 18 comprise lower panel members 26 and upper canvas members 31. The members 31 are connected to blind rollers (not shown) in the roof 10. A door 25 may be provided in the end 18. The portion of the camper below the lateral sections 14 and 16 may include wall members 28. A floor of the camper may be provided by a base board or the like or may be provided by the floor of a vehicle to which the camper is attached.

As is evident from FIG. 1 and 2 the roof 12 of the camper is adapted to be moved between a lower position shown in FIG. 1 and a raised position shown in FIG. 2 and the lateral sections 14 and 16 are adapted to move between a retracted position, shown in FIG. 1, beneath the roof 12 where they overlap one another to a extended position shown in FIG. 2.

As best shown in FIGS. 3, 4, 5 and 6 the laterally extending sections 14 and 16 are connected to roof 12 by strut pairs 32, 34 and 36. It should be noted that only one strut of each pair is shown in FIGS. 3 to 5 and the pair of struts 36 are shown in FIG. 6. The strut pairs 32, 34 and 36 are pivotally connected for movement in a substantially vertical plane on flanges 38 and 40 connected to the roof 12 and sections 14 and 16 respectively. It should be noted that at the right hand end of the camper shown in FIGS. 3 to 5 the struts 34 and 36 are relatively close together. The location of the struts 34 and 36 relatively close together insures rigidity of the structure when the camper is in the erected condition shown in FIG. 3. As best shown in FIG. 6 side walls 23 are supported by generally U-shaped frame members 22 which are supported in loops 42 provided on the inside of the walls 23. The free ends of the frame members 22 are pivotally coupled in support projections 44 connected to sections 14 and 16. The side walls 23 also include a pair of elastic cords 45 which are guided in loops 47 connected to the inside of the walls 23. The cords 45 are generally arranged to extend on either side of frame member 22 and the free ends of the cords 45 are connected to projections 44. When the camper is in the erected condition shown in FIG. 3, the cords 45 are stretched.

The base boards 20 of the sections 14 and 16 are provided with a pair of threaded shafts 50 and 52 mounted in blocks 53 coupled to base boards 20. One of each pair of the shafts is shown in FIGS. 3 to 5. A gear assembly to be more fully described with reference to FIG. 8 is coupled to the shafts 50 and 52. The inner ends of the sections 14 and 16 are provided with rollers 74 and 76. The roller 76 is adapted to engage a guide track 78 and the roller 74 is adapted to engage a guide track 80. The guide tracks 78 and 80 are arranged at ends 18 of the camper and the guide track 80 has a curved end so the roller 74 can easily roll onto the guide track 80. The guide track 78 has a pair of curved ends for easy engagement by the roller 76 so that the roller 76 can easily roll onto the guide track 78. It should be noted that guide tracks 80 and 78 are provided at each end of the camper as are rollers 74 and 76.

The sections 14 and 16 are arranged at different heights as is clear from FIGS. 3 to 5. The guide tracks 80 and 78 are arranged at corresponding heights so that when the sections 14 and 16 are in the retracted position, the sections overlap one another as is shown in FIG. 5. The overlapping of the sections 14 and 16 results in the occupation of minimal space when the sections are in the retracted position and enables the sections 14 and 16 to be made quite large without taking up too much space in the folded condition. Thus the sections 14 and 16 can be used to provide bedding and mattresses or the like 90 can be arranged on the base boards 20 of the sections 14 and 16. Each of the sections 14 and 16 can be made large enough to form a double bed.

Referring now to FIGS. 7 and 8. FIG. 7 shows the drive system without other parts of the camper being shown for purposes of clarity. From FIG. 7 it will be noted that sprocket 66 is provided on one end of shaft 92 and sprocket 70 is arranged on the other end of that shaft. Sprocket 70 communicates with another sprocket 71 via endless belt 68 and drives a further 94. Gear assemblies 60 are arranged on the shaft shafts 92 and 94 and are generally shown in FIG. 8. Each gear assembly 60 is the same apart from the fact that the thread between the gears is opposite as will be described below. The gearing assembly 60 comprises a first gear 61 provided on shaft 92 or 94 which engages a second gear 62 arranged about respective shaft 50 or 52, such as shaft 52 shown in FIG. 8. The shaft 52 is screw threaded and the gear 62 is a cylindrical gear with the internal portion of the gear 62 being screw threaded to match the screw threads on shaft 52. The gear 62 is supported in bearings and bushings 65 coupled to support members 67 which are secured to housings 69 (see FIG. 6) coupled to framing (not shown) of the camper. Actuation of motor M will cause the shaft 92 to rotate and rotation of shaft 92 is imparted to gear 61 which drives cylindrical gear 62 by virtue of the engagement of the helical teeth on the cylindrical gear 62 and the intermeshing teeth on gear 61. Cylindrical gear 62 is therefore caused to rotate about the axis of shaft 52 in bearings and bushes 65 and in view of the thread engagement on the interior of the cylindrical gear 62 and the shaft 52, the shaft 52 is driven in the direction of double headed arrow A dependent on the direction of rotation of motor M. The other gear assemblies 60 are driven in a like manner and it should be noted that the thread between the gear 62 and the shafts 50 is opposite to the thread between the gear 62 and the shafts 52 so that upon rotation of the shaft 62 shafts 50 and 52 are both driven outwardly or both driven inwardly to force the sections 14 and 16 from the retracted position to the extended position or from the extended position back to the retracted position.

Motor M can be actuated by a suitable control (not shown) which includes buttons for turning the motor on and for reversing the direction of the motor to either erect or fold the camper.

FIG. 4 shows the camper in an intermediate position between the fully erected and fully folded conditions. Assuming that the camper is being moved from the folded condition shown in FIG. 5 to the erected condition shown in FIG. 3, it will be evident that the intermeshing of the gear 61, the gear 62 and the shaft 52 or 50 as the case may be will drive the sections 14 and 16 in the direction of arrows B in FIG. 4. Movement of the sections 14 and 16 in the direction of arrow B will cause the struts 32, 34 and 36 to move from the folded position shown in FIG. 5, in which they are generally horizontally disposed, towards the vertical position as the sections 14 and 16 move outwardly. Movement of the struts 32, 34 and 36 will force the roof 12 upwardly and as the roof moves upwardly the walls 23 are drawn outwardly with the frame members 22 into the position shown in FIG. 3 thereby stretching the elastic cords 45. An air ram 100 is arranged between the strut 36 and the roof 12 and a further air ram (not shown) may be arranged between the strut 32 and the roof 12. The air ram 100 is of about 450 Newton capacity and is extended as the roof moves upwardly and generally takes the load of the roof to assist in support of the roof when in the erected condition. In order to collapse the camper 10 the motor M is reversed thereby causing the sections 14 and 16 to be driven inwardly in the direction of arrows C. This in turn causes the struts 32 to be folded back down towards the horizontal position shown in FIG. 5 thereby drawing the roof 12 downwardly. As the roof 12 moves downwardly the air cylinder 100 retracts whilst at the same time supporting the roof and causing generally smooth downward movement of the roof 12. As the roof 12 moves downwardly the canvas side walls 23 begin to collapse and the elastic cords 45 pull the wall 23 inwardly of the camper so that the canvas wall 23 is neatly folded inside the camper as the camper is folded into the collapse condition shown in FIG. 5. In the folded condition the side walls 27 of the roof 12 abut the end walls 29 of the sections 14 and 16 which abut the side walls 28 to seal the camper. It should be noted that the end wall 29 on section 14 is of a greater height than the end wall 29 on section 16 to accommodate the fact that the section 14 is arranged below the section 16 so that they overlap when they move into the folded condition. The guide tracks 78 and 80 guide the movement of the sections 14 and 16 for some, but not all, of the inward and outward movement of the sections 14 and 16. The main purpose of the guides is to guide the sections 14 and 16 as they move into the overlapping position so that they smoothly overlap and do not jam.

It should be noted that the length of the section 16 and is slightly less than the section 14 so that when the camper moves into the collapsed condition the struts 34 and 36 are slightly inwardly of the struts 32 so that the sections 14 and 16 can move into the overlapping configuration without the struts 32 and the struts 34 and 36 contacting one another and jamming.

Furthermore as the roof 12 moves between the extended and retracted positions the canvas member 31 is rolled onto and off the blind roller (not shown) so that the member 31 is neatly stored on the blind roller when the camper is in the collapsed condition and is smoothly rolled off the blind roller as the roof 12 is raised relative to the sections 14 and 16.

Accordingly, when the camper is in the erected condition the area beneath the roof 10 can be used for normal living and be provided with seats which are arranged below the level of the base board 20 of the section 14 and a table can be arranged in the living area with suitable cooking appliances and the like. The laterally extending sections 14 and 16 can be used for bedding and indeed are sufficiently large to each provide a double bed.

Accordingly, the camper of the preferred embodiment of this invention is easy to erect and fold away as it merely requires actuation of a motor and the camper is driven by the motor and associated sprockets and chains into the erected condition and is folded away by simply reverse motion of the motor. The only assembly that a user may be required to do is to provide support struts (not shown) beneath the sections 14 and 16 if they are desired.

The camper, according to the preferred embodiment, therefore has the advantages that it provides two double beds of sleeping accommodation while still being able to be easily erected and folded away with little or no manual labour. In the folded condition the camper can be easily carried in the back of a vehicle such as a four-wheel drive or utility vehicle and in the folded condition would normallly be below the roof level of the vehicle thereby ensuring that the vehicle is not top-heavy.

Since modifications within the spirit and scope of the invention may readily be effected by persons skilled within the art, it is to be understood that this application is not limited to the particular embodiment described by way of example hereinabove.

We claim:

1. A camper, said camper having a roof and a base which define a living area therebetween, two laterally extendable sections between the roof and the base, coupling means for coupling said two laterally extending sections to the roof, said coupling means comprising a first pair of struts extending between an inner portion of one of the laterally extending sections and one end portion of said roof and second pair of struts extending between an inner portion of the other of said laterally extending sections and an opposite end portion of said roof, at least one of said second pair of struts having a further strut arranged in close proximity thereto and extending substantially parallel thereto, said further strut extending between the inner portion of the other of said laterally extending sections and the opposite end portion of the roof, and driving means for moving said two laterally extendable sections between an extended position outwardly of the living area and a retracted position beneath said roof in the living area, wherein upon movement of said laterally extending sections by the driving means the coupling means between the roof and the two laterally extendable sections cause said roof to move between its extended position and retracted position and said laterally extendable sections being overlapped with one another when in the retracted position beneath said roof and the spacial positioning of said first pair of struts, the second pair of struts and further strut being such that the first pair of struts, and the second pair of struts and further strut do not interfere in the retracted position of the extendable sections, and the first pair of struts, second pair of struts and further strut pivot in a generally vertical plane when the laterally extending sections move between the overlapped retracted position and the extended position.

2. The camper of claim 1 wherein the laterally extendable sections are arranged at different heights so that upon movement to the retracted position the sections overlap one another.

3. The camper of claim 1 wherein guide tracks are provided for guiding movement of the sections, each section having a roller for engaging its guide track.

4. The camper of claim 1 wherein at least one extendable ram extends between one of said second pair of struts and said roof.

5. The camper of claim 1 wherein the drive means comprises a motor which drives gear assemblies which engage threaded shafts coupled to the sections for driving the sections between the retracted and extended positions.

6. The camper according to claim 1 including a deformable wall means arranged between said roof and each of said sections, said wall means having elastic means coupled thereto wherein when said roof moves to the extended position said elastic means is stretched and wherein when said roof is moved to the retracted position said elastic means draw said wall means inwardly of said camper to cause the wall means to fold into said camper.

7. The camper of claim 6 wherein the elastic means comprises a plurality of elastic cords.

8. The camper of claim 6 wherein two of said wall means are provided for the camper, each wall means extending between the roof of the camper and a respective one of said laterally extending sections which is adapted to move laterally of said camper from a retracted position to an extended position and wherein said driving means drives said laterally extending sections from the retracted to the extended position.

9. The camper of claim 1 wherein said drive means includes a motor for driving a pair of drive shafts, gears mounted on said drive shafts for engaging cylindrical gears mounted on threaded shafts, said threaded shafts being coupled to ones of said respective laterally extendable sections such that upon actuation of said motor the drive shafts are rotated to cause the gears mounted on said drive shafts to drive the cylindrical gears which rotate to drive said threaded shafts laterally to move the laterally extending sections.

* * * * *